United States Patent Office 2,898,143
Patented Aug. 4, 1959

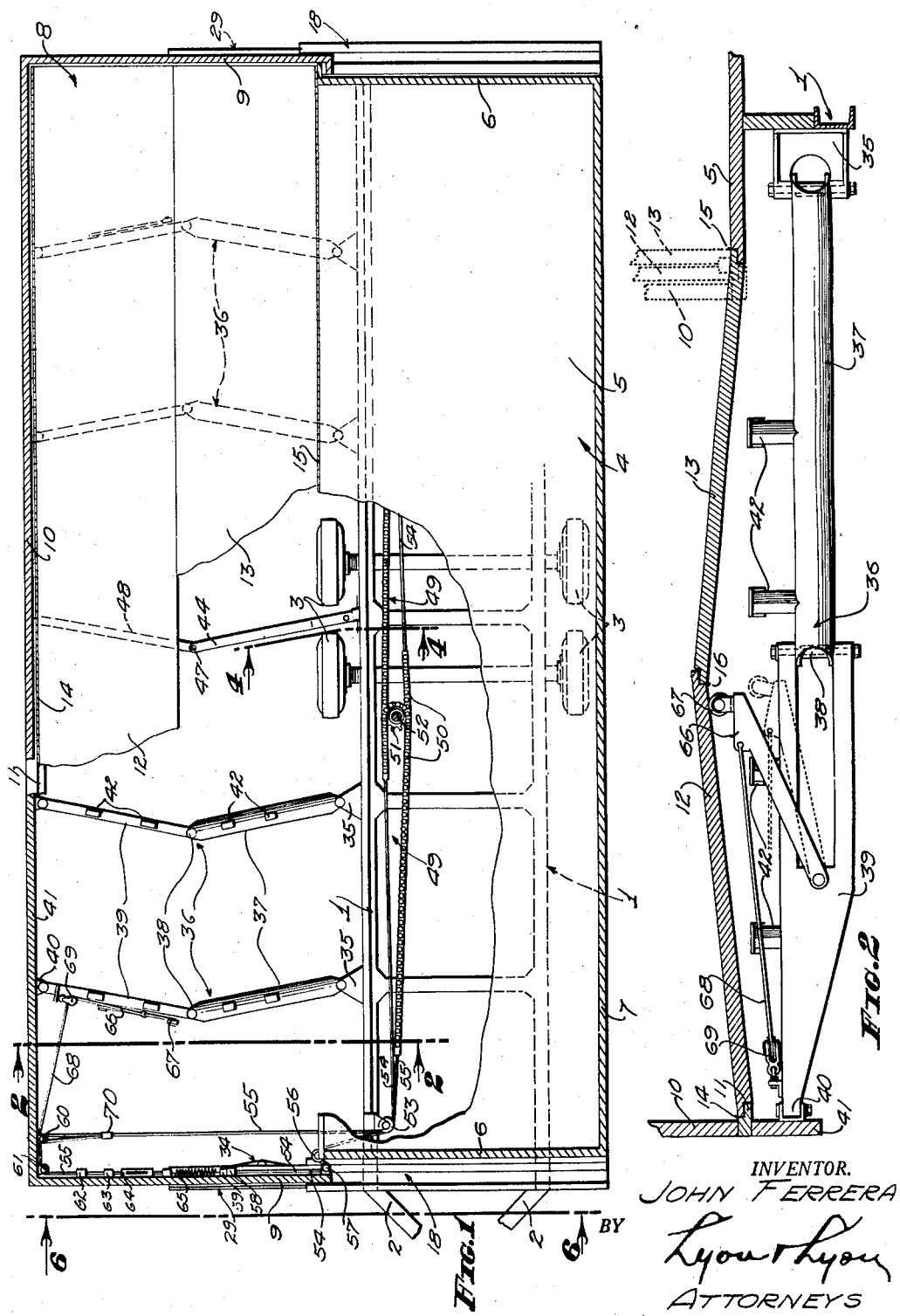

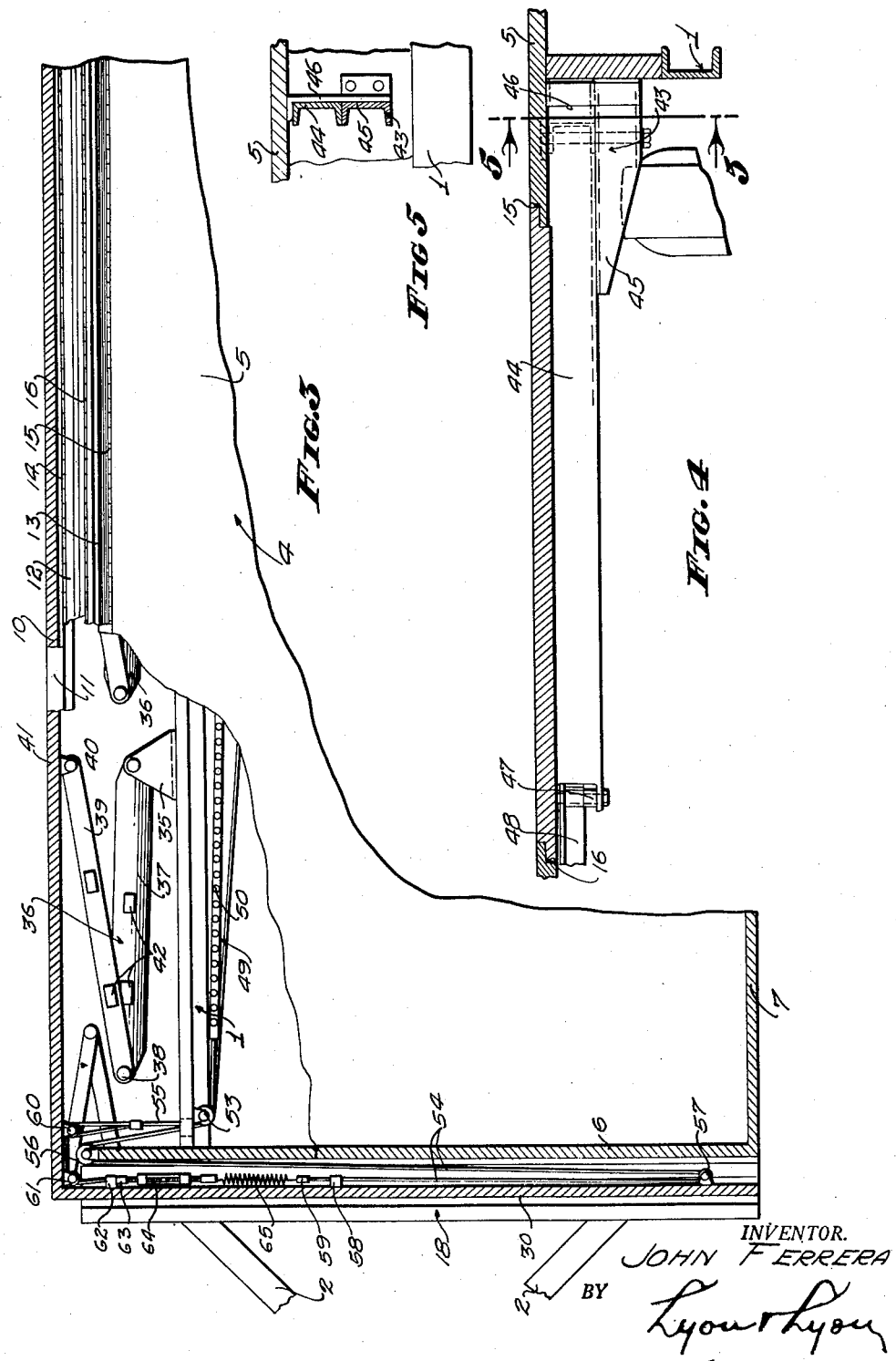

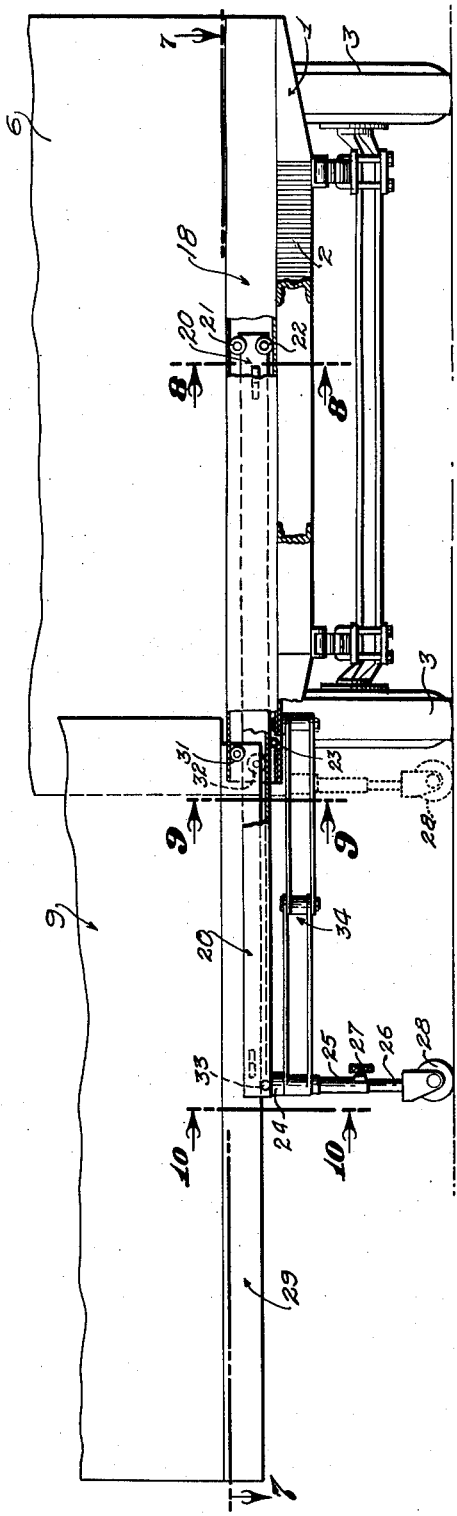

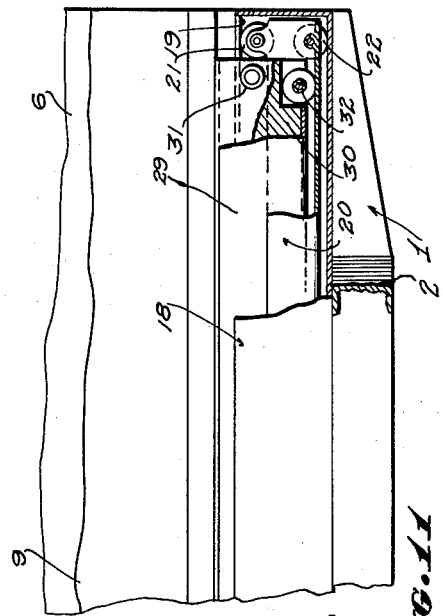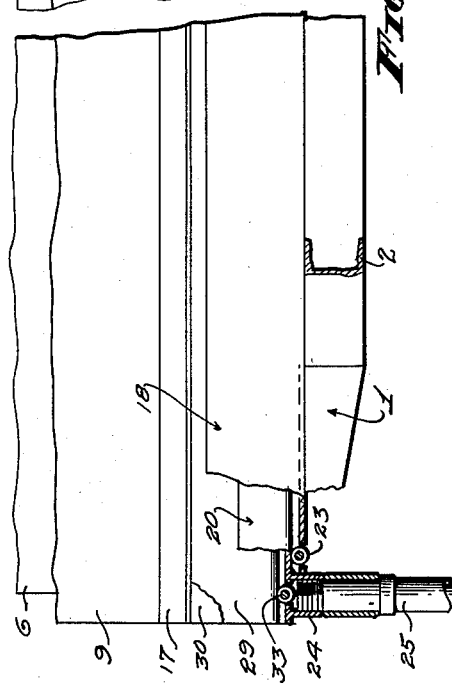

2,898,143

EXTENSIBLE TRAILER

John Ferrera, Los Angeles, Calif.

Application June 8, 1956, Serial No. 590,292

9 Claims. (Cl. 296—23)

This invention relates to extensible trailers and included in the objects of this invention are:

First, to provide an extensible trailer having a fixed section mounted on a wheeled frame and a laterally extensible section so arranged as to permit "push button" control to effect extension or retraction.

Second, to provide an extensible trailer having novelly arranged telescoping tracks at the ends of the fixed and extensible sections and laterally traveling wheels, which permit free movement of the extensible section in proper lateral alignment with the fixed section and in a fully supported condition throughout the range of travel of the extensible section.

Third, to provide in an extensible trailer novel folding beams which extend and retract automatically with extension and retraction of the movable section of the trailer, and which ensure a dependable planar support for the folding floor of the extensible section of the trailer.

Fourth, to provide an extensible trailer which employs a simplified cable drive for extending and retracting the trailer, and which also includes means to effect initial folding of the floor preparatory to retracting the extensible section of the trailer.

With the above and other objects in view, as may appear hereinafter, reference is directed to the accompanying drawings in which:

Figure 1 is a substantially diagrammatical transverse sectional view, taken immediately above the floor of the extensible trailer and showing the extensible trailer in its extended position with portions of the floor broken away to show the construction;

Fig. 2 is an enlarged fragmentary sectional view through 2—2 of Fig. 1, showing particularly one of the folding floor joists and the device initiating the folding of the floor;

Fig. 3 is an enlarged fragmentary sectional view similar to Fig. 1, showing the extensible trailer in its retracted position;

Fig. 4 is a fragmentary sectional view through 4—4 of Fig. 1, showing the construction of the floor joists located between the wheels of the trailer;

Fig. 5 is a fragmentary sectional view through 5—5 of Fig. 4;

Fig. 6 is an enlarged fragmentary partial end elevational, partial sectional view taken along the line 6—6 of Fig. 1, showing the trailer in its extended position;

Fig. 7 is a fragmentary sectional view through 7—7 of Fig. 6, showing the trailer in a partially extended position;

Figs. 8, 9, and 10 are transverse sectional views through 8—8, 9—9, and 10—10, respectively, of Fig. 6;

Fig. 11 is an enlarged fragmentary partial sectional, partial elevational view, taken substantially along the same line as Fig. 6 but showing the trailer in its retracted position.

The trailer is mounted on a chassis frame 1 comprising suitable longitudinal beams and cross beams. At one end of the chassis frame is a conventional towing yoke 2 shown fragmentarily. The chassis frame is centrally supported on two sets of wheels 3. Mounted on the chassis frame 1 is a fixed trailer section 4 having a floor 5, end walls 6, and one side wall 7, the other side being open.

Fitting telescopically over the fixed trailer section 4 and supported in a manner to be described hereinafter is an extensible trailer section 8 having end walls 9 which overlie the end walls 6 and a side wall 10, the other side being open.

The trailer sections are, of course, provided with roofs, not shown, the roof of the extensible section 8 overlying the roof of the fixed trailer section 4. Such general construction is best shown in the aforementioned copending application. However, for the purposes of the present invention the manner in which the extensible trailer section overlies the fixed trailer section and the manner of sealing the connections between the two trailer sections may be considered as conventional.

At the bottom of the side wall 10 is a marginal flange 11. Between the marginal flange 11 and the floor 5 of the fixed trailer section 4 there is mounted a pair of floor sections 12 and 13 which are connected to the marginal flange 11 and floor 5, respectively, by hinges 14 and 15, and are joined to each other by a hinge 16.

The floor sections 12 and 13 form the floor of the extensible trailer section 8 when extended to a coplanar position. When the extensible trailer section 8 is retracted, as shown in Fig. 3, the floor sections 12 and 13 fold into an upright position. The end walls 9 of the extensible trailer section are provided with marginal flanges 17 which support the floor sections when the trailer is extended.

Supported outwardly of each end wall 6 of the fixed trailer section 4 is a fixed track 18. Each fixed track is in box or channel form having along its upper margin inturned flanges or lips 19. Each fixed track slidably receives an intermediate track 20 which is also channel-shaped. The intermediate track is provided at its inner end with upper wheels 21 adapted to engage under the inturned lips 19 and lower wheels 22 which ride on the bottom of the fixed track. The fixed track 18 is provided at its forward end, that is, the end corresponding to the side of the trailer from which the extensible trailer section 8 moves, with a roller 23 which supports the forward end of the intermediate track 20.

The forward extremity of the intermediate track 20 is provided with a depending mounting collar 24 in which is secured a sleeve 25. The sleeve slidably receives a post 26 which may be secured in any desired position by a lock screw 27. The lower end of the post 26 carries a wheel 28 which is adapted to roll on the ground and support the outer end of the intermediate track 20.

Slidably mounted within the intermediate track 20 is an extensible track 29 which is likewise channel-shaped and which receives and supports a beam 30 forming the lower end of an end wall 9 of the extensible trailer section 8. The inner end of the extensible track 29 is provided with upper wheels 31 which ride under the inturned lips 19 of the fixed track 18, and the lower wheels 32 which ride on the bottom of the intermediate track 20. The outer end of the inner intermediate track 20 is provided with a roller 33 which supports the outer end of the extensible track 29.

Suitably and pivotally secured to the sleeve 25 and to the underside of the fixed track 18, or to a suitable adjacent point of the under frame of the fixed trailer section 4, is a foldable arm 34 comprising two sections pivotally connected together. The foldable arm 34 limits the travel of the intermediate track 20 so that the intermediate track extends only approximately half its length from the fixed track 18.

Suitably secured to the chassis frame 1 or to the under frame supporting the floor of the fixed trailer section 4 are a series of brackets 35. A corresponding number of foldable joist units 36 are provided. Each floor joist unit includes an arm 37 pivotally connected to a bracket 35 for movement in a horizontal plane. The arm 37 is connected by a journal 38 to a second arm 39 which likewise moves in a horizontal plane.

Each second arm 39 is joined by a pivotal connection 40 to a beam 41 forming the lower extremity of the side wall 10 of the extensible trailer section 8. Mounted at appropriate points on the arms 37 and 39 are floor-supporting posts 42 upon which the floor sections 12 and 13 rest when these sections are in their extended or flat position. A special folding floor joist is required in the region outwardly from the wheels 3. This joist is shown fragmentarily in Figs. 4 and 5 and comprises a bracket 43 which pivotally supports an arm 44 located so as to immediately underlie the floor.

A reinforcing beam 45 extends from the bracket 43 so as to underlie the arm 44 when the arm is in its extended position. A stop 46 is provided which projects upwardly from one side of the reinforcing beam 45 to engage the arm 44 and limit extended movement. The arm 44 is joined by a pivotal connection 47 to a second arm 48 which in turn is pivotally connected to the beam 41 in the manner as the floor joist units 36.

It will be observed that, as shown in Fig. 1, the arms 37 and 39 as well as the arms 44 and 48 do not move to positions of alignment when the extensible trailer section 8 occupies its extended position. This is desirable for the reason that the floor joist units 36 must be free to fold or extend horizontally with movement of the extensible trailer section 8.

The trailer is extended and retracted by means of cables 49. These cables include drive chain sections 50 which wrap around sprockets 51 mounted on a drive shaft 52 adapted to be operated by a motor, not shown. The two ends of each operating cable 49 pass around a double pulley 53 located near the ends of and under the floor of the fixed trailer section 4. Beyond the pulley 53 the ends of the cable separate to form an extension reach 54 and a retraction reach 55.

The extension reach 54 passes around a pulley 56 mounted adjacent the forward end of the fixed track 18 and around a second pulley 57 carried by the inner end of the corresponding extensible track 29. The extension reach 54 continues along the side of the extensible track 29 and through a guide abutment 58 secured to the extensible track and terminates in a collar 59.

The retraction reach 55 extends around a pair of spaced pulleys 60 and 61 mounted on the beam 41 under the side wall 10 of the extensible trailer section 8, then extends backwardly along the corresponding extensible track 29 through a guide abutment 62 and terminates in a collar 63.

Between the collars 59 and 63 there is interposed a turnbuckle 64 and a tension spring 65. The collar 59 engages the guide abutment 58 so that the extension reach 54 may be placed under tension to draw the pulley 57 toward the pulley 56 thereby to extend the trailer section 8. The collar 63 engages the guide abutment 62 so that the retraction reach 55 may be placed under tension to draw the pulleys 60 and 61 toward the pulley 53 thereby to retract the trailer section 8.

The guide abutments 58 and 62 and their collars 59 and 63 are so arranged as to provide a predetermined lost motion before extension or retraction of the trailer section 8. This lost motion is utilized to effect initial lifting of the floor sections 12 and 13. For this purpose a floor-lifting lever 66 is provided on the foldable floor joist unit 36 nearest each end of the extensible trailer section 8.

The floor-lifting lever 66 is provided with a roller 67 located so as to engage the under side of one of the floor sections at the line near the hinge 16. Each floor-lifting lever 66 is operated by a cable 68 which passes around a pulley 69 and is joined to the retraction reach 55 of the corresponding cable 49 by a fitting 70.

Operation of the extensible trailer is as follows:

Assuming first that the extensible trailer section 8 is in its retracted position with its end walls 9 disposed outwardly of the end walls 6:

When the extensible trailer is in its retracted position, the extensible track 29 and intermediate track 20 are fully telescoped in the fixed track 18, the extensible trailer section 8 overlies the fixed trailer section with the end walls 9 disposed outwardly of the end walls 6; the foldable joist units 36 and the special joist comprising arms 44 and 48, as well as the folding arm 34, are folded horizontally; and the floor sections are folded upwardly.

To open or extend the trailer, the drive shaft 52 is rotated by any suitable means so as to draw on the extension reaches 54 of the two cables and play out the retraction reaches 55 thereof. The ends of the extension reaches are restrained by engagement of the collars 59 with the guide abutments 58 so that the pulley 57 is drawn toward the pulley 56, forcing the extensible track 29 outwardly and carrying the extensible track section 8 outwardly from the fixed trailer section 4.

Prior to extending the trailer, the wheels 28 are lowered by movement of the posts 26 and the sleeves 25. The posts 26 are locked in position so that the wheels 28 engage the ground so that upon extension of the trailer section 8 the trailer section is supported by the wheels 28. It will be noticed that the wheels are approximately under the center of gravity of the extensible trailer section so that the extensible trailer section may move outwardly from the fixed trailer section without other support. During outward movement of the extensible trailer section, the joist units 36 unfold and the floor sections flatten and rest upon the joist units.

Once the trailer section 8 is extended, conventional trailer jacks may be placed under the corners of the fixed and extensible trailer sections, or otherwise positioned to relieve the trailer sections from the yieldable mounting inherent in the support afforded by the wheels 3. This is a practice employed in connection with conventional trailers as well as extensible trailers.

When it is desired to retract the trailer section 8, the jacks are removed and any furniture or other equipment which may have been placed on the floor sections 12 and 13 is removed, whereupon the drive shaft 52 is rotated in the opposite direction so as to draw in on the retraction reaches 55 and play out the extension reaches 54 of the operating cables 49.

Prior to initial retraction movement of the trailer section 8 and within the range of lost motion provided between the guide abutments 58 and 62, the cables 68 are operated to raise the levers 66 so as to initiate folding of the floor sections 12 and 13, as indicated in Fig. 2. Once the folding movement of the floor sections has been initiated, the floor sections automatically fold upwardly and the floor joist units 36 automatically fold laterally or horizontally as the trailer section 8 is telescoped over the trailer section 4 and the extensible track 29 and intermediate track 20 telescope into the fixed track 18. Once the trailer section 8 is retracted, the wheels 28 are raised or otherwise positioned so that the trailer may be transported on its wheels 3.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. In an extensible trailer including a fixed trailer section and an extensible trailer section movable relative to the fixed trailer section between a telescoped position and an extended position, the combination of a trailer extending and telescoping means comprising: a track means for guiding said extensible trailer section; ground wheels carried by said extensible trailer section and movable downwardly therefrom to engage the ground and support said extensible trailer section, said ground wheels being movable from said fixed trailer section approximately half the travel of said extensible trailer section, whereby the main weight of said extensible trailer section is carried on said ground wheels, and, when extended, said extensible trailer section is substantially balanced on said ground wheels.

2. In an extensible trailer including a fixed trailer section and an extensible trailer section movable relative to the fixed trailer section between a telescoped position and an extended position, the extensible trailer section having foldable floor units hinged for movement between a horizontal coplanar position locking said extensible trailer in its extended position and an upright folded position assumed when said trailer sections are telescoped, the combination of a trailer extending and telescoping means comprising: a track means for guiding said extensible trailer section; ground wheels carried by said extensible trailer section and movable downwardly therefrom to engage the ground and support said extensible trailer section, said ground wheels being movable from said fixed trailer section approximately half the travel of said extensible trailer section, whereby the main weight of said extensible trailer section is carried on said ground wheels, and, when extended said extensible trailer section is substantially balanced on said ground wheels; a mechanical actuating means for relatively extending and telescoping said trailer sections, said actuating means including a portion freely movable relative to said extensible trailer section through a limited range to provide a lost motion connection permitting a predetermined initial movement of said actuating means before telescoping of said trailer sections; a thrust means located under said foldable floor units to initiate folding of said floor units; and means operatively connecting said thrust means to said actuating means for operation during initial movement of said actuating means within the limits of said lost motion linkage.

3. In an extensible trailer including a fixed trailer section and an extensible trailer section movable relative to the fixed trailer section between a telescoped position and an extended position, the extensible trailer section having foldable floor units hinged for movement between a horizontal coplanar position locking said extensible trailer in its extended position and an upright folded position assumed when said trailer sections are telescoped, the combination of a trailer extending and telescoping means comprising: a mechanical actuating means located below said floor for relatively extending and telescoping said trailer sections, said actuating means including a portion freely movable relative to said extensible trailer section through a limited range to provide a lost motion connection permitting a predetermined initial movement of said actuating means before telescoping of said trailer sections; a plurality of extensible and retractable floor joists disposed under said floor units; a device carried by at least one of said floor joists and positioned thereby, when said floor units are in their extended coplanar locking position, for upward movement to engage and effect initial folding of said floor units from their coplanar locking position; and means connected with said actuating means and having an operative condition for raising said device to effect folding of said floor units and an inoperative condition permitting collapse of said device clear of said floor units; said means being disposed in its operative condition, when said trailer sections are relatively extended, and operable during the lost motion movement of said actuating means to cause initial folding of said floor units, and said means being disposed in its inoperative position when said trailer sections are retracted.

4. An extensible trailer, comprising: a fixed trailer section; a movable trailer section; a foldable floor structure for said movable trailer sections including a pair of upwardly foldable floor members hinged together and to said fixed and movable trailer sections; extensible track structures including fixed tracks at the ends of said fixed trailer section, and movable tracks supporting the ends of said movable trailer section; means for extending and retracting said movable trailer including pulleys at the extremities of each movable track, pulleys at the end of each fixed track from which said movable track extends, stop means between said movable track pulleys, a cable extending between the pulleys of each movable track and having means engageable with said stops to permit limited free movement of said cable, each cable also including an extension reach passing around one pulley of each movable track and a pulley of the corresponding fixed track to said fixed trailer section, and a retraction reach passing around the other of said corresponding movable track pulleys directly to said fixed trailer section; means for paying out one reach of each cable while drawing in the other reach thereof to extend and retract said movable trailer section; and means for initiating folding of said floor structure including a lever member positioned to exert an upward force thereon, and a line connecting said lever with one of said cables, said line being operable during free movement of said cables prior to retraction of said movable trailer section to raise said lever for engagement with the underside of said floor structure.

5. An extensible trailer, comprising: a fixed trailer section; a movable trailer section; a first track at each end of said fixed trailer section; a second track secured under each end of said movable trailer section; an intermediate track interposed between each first and second track; stop means limiting movement of each intermediate track to a position wherein its extended end is approximately in the vertical plane of the center of gravity of said movable trailer section; a pair of ground wheels at the extended ends of said intermediate tracks movable therewith from and toward said fixed tracks as said intermediate track is extended and retracted to maintain ground support for said movable trailer section whereby said support is in substantially the vertical plane of the center of gravity of said movable trailer section when said section is fully extended.

6. An extensible trailer, comprising: a fixed trailer section; a movable trailer section; a first track at each end of said fixed trailer section; a second track secured under each end of said movable trailer section; an intermediate track interposed between each first and second track; stop means limiting movement of each intermediate track to a position wherein its extended end is approximately in the vertical plane of the center of gravity of said movable trailer section; a pair of ground wheels at the extended ends of said intermediate tracks movable therewith from and toward said fixed tracks as said intermediate track is extended and retracted to maintain ground support for said movable trailer section whereby said support is in substantially the vertical plane of the center of gravity of said movable trailer section when said section is fully extended; and foldable brace members interconnecting said ground wheels and fixed trailer section.

7. An extensible trailer, comprising: a first trailer section; extensible track means at the ends thereof having a retracted position approximately the width of the first trailer section and an extensible position approximately twice the width thereof; means for supporting the extensible portions of said track means during extension and retraction; a second trailer section supported at its ends on said track means and movable between a retracted position overlying said first trailer section and an extended position laterally thereof; a floor for said trailer sections, the floor in said second section being divided longitudinally and hinged so as to double upon itself when said second trailer section is retracted and to occupy a flat position when said second trailer section is extended; and mechanical actuating means located under said floor for extending and retracting said second trailer section, said actuating means including a portion freely movable relative to said second trailer section through a limited range to provide a lost motion connection permitting a predetermined initial movement of said second trailer section, and a floor elevating device located under said longitudinally divided floor and operatively connected with said actuating means to initiate folding of said floor from its flat position during said initial movement of said actuating means prior to retraction of said second trailer section.

8. An extensible trailer, comprising: a wheeled chassis; a first trailer section fixed thereon; a pair of fixed transversely disposed track members at the ends of said first trailer section; a pair of intermediate track members guided by said fixed track members for lateral movement between a retracted position within the fixed track members and a partially extended position; a pair of extensible track members guided by said intermediate track members for movement between a retracted position within said intermediate track members and a partially extended position relative thereto; a second trailer section supported by said extensible track members and movable by said extensible and intermediate track members between a retracted and a laterally extended position relative to said first trailer section; means for extending and retracting said second trailer section including a pair of cables attached at their ends to said extensible track members, means for paying out one end of each cable while drawing in the other end thereof, and pulleys positioned to guide said cable whereby when one end of each cable is drawn in the second trailer section is extended, and when the other end of each cable is drawn in the second trailer section is retracted; a folding floor for said second trailer section overlying said extending and retracting means and adapted to fold as said second trailer section is retracted; lost motion connections under said folding floor, interposed between said cables and extensible track members to permit limited free movement of said cables prior to retracting said second trailer section; and floor lifting levers under said folding floor operatively connected with said cables to initiate folding movement of said floor, during said limited free movement.

9. An extensible trailer, comprising: a first trailer section; a second trailer section movable laterally thereof between an extended and a retracted position; foldable floor units for said second trailer section hinged for movement between a horizontal coplanar position locking said second trailer section in its extended position and an upright folded position assumed when said second trailer section is retracted; a mechanical actuating means located under said foldable floor units for extending and retracting said second trailer section, said actuating means including a portion freely movable relative to said second trailer section through a limited range to provide a lost motion connection permitting a predetermined initial movement of said actuating means before effecting retraction of said trailer section; a floor elevating device under said floor units; means for moving said floor elevating device between an operative position when said second trailer section is extended and an inoperative position when said second trailer section is retracted; means connecting said floor elevating device with said actuating means, said connecting means being operative during and in response to the lost motion movement of said actuating means to raise said floor elevating device thereby to initiate folding of said floor units.

References Cited in the file of this patent

UNITED STATES PATENTS

| | | |
|---|---|---|
| 2,147,892 | Gray | Feb. 21, 1939 |
| 2,606,057 | Johnson | Aug. 5, 1952 |
| 2,634,462 | Graven | Apr. 14, 1953 |
| 2,636,773 | Van Tassel | Apr. 28, 1953 |
| 2,675,277 | McClellan | Apr. 13, 1954 |
| 2,732,251 | Meaker | Jan. 24, 1957 |

FOREIGN PATENTS

| | | |
|---|---|---|
| 1,065,286 | France | Jan. 6, 1954 |